3,000,704
PURIFICATION OF HYDROUS TITANIA
Alan Stanley, Savannah, Ga., and Herbert A. McKenzie, Madison Heights, Va., assignors to American Cyanamid Company, New York, N.Y., a corporation of Maine
No Drawing. Filed Apr. 21, 1959, Ser. No. 807,770
10 Claims. (Cl. 23—202)

The present invention relates to the purification of hydrous titania. More particularly, the present invention relates to the beneficiation of hydrous titania by removing adsorbed di- and polyvalent metal (particularly iron) ions therefrom.

A major part of the titanium dioxide pigment of commerce is currently manufactured by a process which comprises digesting an oxidic ferrotitaniferous material (for example, ilmenite ore or slag derived therefrom) with sulfuric acid to form a titanium sulfate digestion cake, dissolving the cake in water, filtering off the resulting titanium sulfate-iron sulfate solution, reducing the ferric sulfate to ferrous sulfate, hydrolyzing the titanic sulfate content of the solution to hydrous titania, filtering and washing the titania, and calcining the titania to titanium dioxide.

Hydrous titania has ion-exchange properties and even after prolonged washing still has a content of di- and polyvalent metal ions, notably iron, which it has not yet been found practical to remove except by further extensive chemical processing; cf. Tanner et al. U.S. Patents Nos. 2,771,345 and 2,842,428, granted on November 20, 1956, and July 8, 1958, respectively. These ions, although present in amounts of a few parts per million, are significant from the tinctorial point of view as they cause the hydrous titania, when calcined, to convert to titanium dioxide of substantially less brightness then would otherwise be the case. This effect is due to distortion of the titanium-oxygen crystal lattice and not to the color inherently possessed by the adsorbed ions.

The discovery has now been made that hydrous titania containing adsorbed di- and polyvalent metal ions can be beneficiated for pigmentary purposes by a two-step process which comprises first contacting the titania with an aqueous acid solution of titanous sulfate until the titania acquires an adsorbed content of titanous titanium and then contacting the titania with an aqueous solution of an organic surface-active agent, until at least part of the adsorbed metal ions are desorbed. The solution displaces at least part of the adsorbed metal ions from the hydrous titania, as a result of which a whiter pigment is obtained on calcination.

The solution used for the first step is preferably a solution of 0.05%–5% by weight of titanous sulfate in sulfuric acid of 5% to 15% $H_2SO_4$ content by weight, having a temperature between 50° C. and 65° C.

The second solution is preferably a solution of a surface-active agent in water between 50° C and 75° C.; the pH of the solution is preferably about neutral to minimize hydrolysis of the agent. We have not found need for surface-active concentrations in excess of 100 parts per million and best results have been obtained in the range of 12–50 parts per million.

It is important that in the first step, contact of the hydrous titania with the titanous sulfate solution be continued until the titania acquires an adsorbed content of reduced (i.e, trivalent) titanium. Evidently this ensures that the iron adsorbed on the pigment is in the reduced or ferrous state while the action of the surface-active agent proceeds. Under preferred conditions adsorption equilibrium between the hydrous titania and the reduced titanium occurs within about an hour. A longer period of treatment does no harm.

The second step proceeds slowly and should be continued until a substantial amount of iron and other polyvalent metal ions have been desorbed, as evidenced by improved brightness when the hydrous titania is calcined to titanium dioxide. The procedure is one of diminishing returns per unit of time, and in general it is not economic to wash the hydrate with the solution of surface-active agent for more than six hours. A wide variety of surface-active agents have proved useful, and evidently the invention does not depend upon the particular agent or mixture of agents used.

The invention will be further described by the examples which follow. These examples illustrate particular embodiments of the invention and are not to be construed as limitations thereon.

Examples 1–20

The following illustrates the variety of surface-active agents which may be used to beneficiate hydrous titania according to the present invention.

Washed titania hydrate (containing 30% solids by weight calculated as $TiO_2$ and about 10 p.p.m. of adsorbed polyvalent metal, chiefly iron ions, produced by digesting ilmenite ore concentrate with sulphuric acid of 85% strength to form a digestion cake, dissolving the cake in water, adding metallic iron until all the ferric sulfate therein is reduced to ferrous sulfate, decanting and filtering the resulting titanium sulfate-ferrous sulfate solution, hydrolyzing the titanium sulfate by boiling in the presence of nucleating agent, filtering off the mother liquor, and washing the cake with water until no iron is detectable in the filtrate) is slurried for one hour with moderate stirring in a laboratory beaker with three times its weight of hot (60° C.) sulfuric acid of 10% strength containing 0.1% titanous sulfate by weight and is then washed with neutral iron-free water at 60° C. containing wetting agent as shown in the table below for three hours on a Büchner funnel. Similar titania hydrate is processed in the same manner as control, the surface-active agent wash being replaced by a wash with deionized water at 60° C. The resulting pairs of hydrates are dewatered on a filter, and washed on the filter for four hours with metal-free neutral water.

The improvement in brightness from the action of the wetting agent is determined by converting the hydrates to titanium dioxide pigment and comparing the panels carrying the pigments in a baked alkyd resin enamel prepared as shown in Example 1 of Marcot et al. U.S. Patent No. 2,766,133 granted October 9, 1956. Results are reported in "points," each point representing one clearly discernible unit of brightness.

Results are as follows:

| Run No. | Surface-active agent used | | | Brightness improvement (points) |
|---|---|---|---|---|
| | Name | Type | P.p.m.[1] | |
| 1 | Disodium N-octyl sulfosuccinate. | Anionic | 500 | 1 |
| 2 | ---do--- | ---do--- | 25 | 1 |
| 3 | ---do--- | ---do--- | 12 | 2 |
| 4 | Sodium dihexyl sulfosuccinate | ---do--- | 25 | 1 |
| 5 | ---do--- | ---do--- | 12 | 2 |
| 6 | Sodium dioctyl sulfosuccinate | ---do--- | 25 | 1 |
| 7 | Sodium 2-ethylhexyl sulfosuccinate. | ---do--- | 50 | 2 |
| 8 | Triethanolamine 2-hexanoate | ---do--- | 50 | 2 |
| 9 | ---do--- | ---do--- | 25 | 1 |
| 10 | ---do--- | ---do--- | 12 | 1 |
| 11 | Sodium capryl tripolyphosphate. | ---do--- | 25 | 3 |
| 12 | Sodium methylamyl sulfosuccinate. | ---do--- | 25 | 2 |
| 13 | Disodium N-octadecyl sulfosuccinamate. | ---do--- | 500 | 1 |
| 14 | ---do--- | ---do--- | 50 | 1 |
| 15 | ---do--- | ---do--- | 25 | 2 |
| 16 | ---do--- | ---do--- | 12 | 3 |
| 17 | Reaction product of ethylene oxide with mixture of octadecylamine and octadecylguanidine salts of octadecyl carbamic acid. | Cationic | 25 | 2 |
| 18 | Tri($C_5$–$C_{12}$ alkyl) phosphate | Non-ionic | 50 | 2 |
| 19 | ---do--- | ---do--- | 25 | 3 |
| 20 | ---do--- | ---do--- | 12 | 2 |

[1] By weight, based on the weight of the solution.

The results show that while the benefits of the invention are obtained when the surface-active agents are used at substantial concentrations (see Runs 1 and 13), best results are obtained when the agents are used at concentrations less than 50 p.p.m. (see Runs 11, 16 and 19). Best results appear to have been obtained with disodium N-octadecyl sulfosuccinamate (No. 16).

We claim:

1. A process of beneficiating washed hydrous titania containing adsorbed di- and polyvalent metal ions including iron ions which comprises contacting said hydrous titania first with aqueous acidic titanous sulfate solution until said titania has an adsorbed content of titanous titanium, and then contacting said hydrous titania with an aqueous solution of an organic surface-active agent until some of said ions are desorbed from said oxide into said solution.

2. A process according to claim 1 wherein the aqueous acidic titanous sulfate solution is a solution of titanous sulfate in sulfuric acid.

3. A process according to claim 1 wherein the concentration of surface-active agent in said solution is less than 50 parts per million by weight.

4. A process according to claim 1 wherein the solution of the surface-active agent has a pH of about 7.

5. A process according to claim 1 wherein the temperature of the solution of the surface-active agent is between 50° and 75° C.

6. A process according to claim 1 wherein the surface-active agent is sodium capryl tripolyphosphate.

7. A process according to claim 1 wherein the surface-active agent is disodium N-octadecyl sulfosuccinamate.

8. A process according to claim 1 wherein the surface-active agent is a triester of phosphoric acid with a $C_5$–$C_{12}$ alkanol.

9. A process of beneficiating washed hydrous titania containing adsorbed iron ions which comprises contacting said hydrous titania first with a solution of titanous sulfate in dilute sulfuric acid until said hydrous titania has an adsorbed content of titanous titanium, and then with a neutral aqueous solution of an organic surface-active agent until some of said ions are desorbed.

10. A process of beneficiating washed hydrous titania containing adsorbed iron ions, which comprises contacting said hydrous titania first with a solution of titanous sulfate in sulfuric acid until adsorption equilibrium between the hydrous titania and the titanous sulfate substantially occurs, and then washing said hydrate with about neutral water containing less than 100 parts per million by weight of an organic surface-active agent until at least part of the adsorbed iron ions are desorbed.

References Cited in the file of this patent
UNITED STATES PATENTS 2,592,973     Sturgeon et al.     Apr. 15, 1952

OTHER REFERENCES

Jacobson book, "Encyclopedia of Chemical Reactions," vol. 6, 1956, pp. 124–132, Reinhold Publ. Corp., N.Y.

Barksdale, "Titanium," The Ronald Press Co. (1949), p. 202.